United States Patent
Ibrahim et al.

(10) Patent No.: US 10,936,879 B2
(45) Date of Patent: Mar. 2, 2021

(54) SYSTEM FOR DISPLAYING THE STATUS OF USE OF AIRCRAFT OVERHEAD LUGGAGE STORAGE BINS

(71) Applicant: The Boeing Company, Chicago, IL (US)

(72) Inventors: Yakentim M. Ibrahim, Brier, WA (US); Kevin S. Callahan, Shoreline, WA (US); James P. Schalla, Edmonds, WA (US)

(73) Assignee: THE BOEING COMPANY, Chicago, IL (US)

( * ) Notice: Subject to any disclaimer, the term of this patent is extended or adjusted under 35 U.S.C. 154(b) by 146 days.

(21) Appl. No.: 15/383,851

(22) Filed: Dec. 19, 2016

(65) Prior Publication Data

US 2018/0173962 A1    Jun. 21, 2018

(51) Int. Cl.
*G06K 9/00* (2006.01)
*H04N 7/18* (2006.01)
(Continued)

(52) U.S. Cl.
CPC ....... *G06K 9/00771* (2013.01); *B61D 37/003* (2013.01); *B64D 11/003* (2013.01);
(Continued)

(58) Field of Classification Search
CPC ...... G03B 21/26; B61D 37/003; B64D 45/00; B64D 2045/007; B64D 11/003;
(Continued)

(56) References Cited

U.S. PATENT DOCUMENTS 6,964,481 B2    11/2005   Pho et al.
7,499,802 B2    3/2009    Mishima
(Continued)

FOREIGN PATENT DOCUMENTS

EP    3244618A1 A1    11/2017
JP    2018011290 A    1/2018

OTHER PUBLICATIONS

European Extended Search Report for EP 17196258.2-1754, dated Nov. 22, 2017.
(Continued)

*Primary Examiner* — Zhihan Zhou
(74) *Attorney, Agent, or Firm* — Moore Intellectual Property Law, PLLC (57) ABSTRACT

A system and method are disclosed for displaying the storage status of overhead luggage storage bins in an aircraft. A camera is provided that is mounted with a field of view directed at an inner portion of a group of open bins. The camera is communicatively coupled to a controller and selectively provides images of the inner portion of the bins immediately prior to when the bins are closed to the controller. A projector is also provided for each group of bins. The projector is communicatively coupled to the controller and is mounted such that an image received from the controller is projected onto an outer surface of the closed bins. The controller receives images from each of the cameras and selectively provides such images to the projector associated with each camera so that a storage status display is projected on an outer surface of the bins.

20 Claims, 4 Drawing Sheets

(51) Int. Cl.
*H04N 9/31* (2006.01)
*B61D 37/00* (2006.01)
*B64D 11/00* (2006.01)
*B64D 45/00* (2006.01)
*B64D 47/08* (2006.01)
*H04N 5/232* (2006.01)
*H04N 5/247* (2006.01)

(52) U.S. Cl.
CPC .............. *B64D 45/00* (2013.01); *B64D 47/08* (2013.01); *H04N 5/23293* (2013.01); *H04N 5/247* (2013.01); *H04N 7/181* (2013.01); *H04N 9/31* (2013.01); *B64D 2045/007* (2013.01)

(58) Field of Classification Search
CPC .......... B64D 47/08; H04N 7/181; H04N 9/31; H04N 5/247; H04N 5/23293
USPC .................. 348/113–119, 140–161, 836–843
See application file for complete search history.

(56) References Cited

U.S. PATENT DOCUMENTS

| | | |
|---|---|---|
| 8,631,697 B2 | 1/2014 | Di Giugno |
| 9,126,705 B2 | 9/2015 | Ours |
| 2005/0076372 A1 | 4/2005 | Moore et al. |
| 2005/0110952 A1* | 5/2005 | Pho .......................... A47C 1/13 353/28 |
| 2005/0168630 A1 | 8/2005 | Yamada et al. |
| 2006/0161345 A1 | 7/2006 | Mishima |
| 2007/0101398 A1 | 5/2007 | Islam et al. |
| 2007/0252038 A1 | 11/2007 | Santiago Alvarez |
| 2007/0265890 A1 | 11/2007 | Curtis |
| 2008/0071398 A1 | 3/2008 | Kneller |
| 2008/0251640 A1 | 10/2008 | Johnson et al. |
| 2009/0094615 A1 | 4/2009 | Ohno et al. |
| 2010/0100225 A1* | 4/2010 | Reed ........................ B64D 9/00 700/213 |
| 2012/0137636 A1 | 6/2012 | Ours |
| 2012/0242508 A1 | 9/2012 | Kohlmeier-Beckmann |
| 2012/0330850 A1 | 12/2012 | Di Giugno |
| 2013/0055321 A1 | 2/2013 | Cline et al. |
| 2013/0070860 A1 | 3/2013 | Schramm et al. |
| 2013/0290221 A1 | 10/2013 | Jindel |
| 2013/0298173 A1 | 11/2013 | Couleaud et al. |
| 2014/0077952 A1* | 3/2014 | Boss .................. G06Q 10/0832 340/572.1 |
| 2014/0192268 A1 | 7/2014 | Petrisor et al. |
| 2015/0239561 A1 | 8/2015 | Hau |
| 2015/0241209 A1 | 8/2015 | Jouper |
| 2016/0109280 A1 | 4/2016 | Tiu et al. |
| 2016/0332729 A1 | 11/2016 | Woicekowski |
| 2017/0137032 A1 | 5/2017 | Wuthnow et al. |
| 2017/0200203 A1* | 7/2017 | Kingsbury ......... G06K 9/00771 |
| 2017/0230620 A1 | 8/2017 | Watanabe |
| 2017/0316664 A1* | 11/2017 | Gerard ............... H04N 5/23203 |
| 2017/0332148 A1 | 11/2017 | Fullerton et al. |

OTHER PUBLICATIONS

European Extended Search Report for EP 3244618A1, dated Sep. 18, 2017, 7 pgs.
Office Action dated Nov. 3, 2020 issued in corresponding Canadian Application No. 2,982,184, pp. 1-4.

* cited by examiner

SYSTEM FOR DISPLAYING THE STATUS OF USE OF AIRCRAFT OVERHEAD LUGGAGE STORAGE BINS

CROSS-REFERENCE TO RELATED APPLICATIONS

This application is related to U.S. Patent Publication No. 2016/0109280 A1 entitled "SMART AIRCRAFT OVERHEAD LUGGAGE BIN SYSTEM" filed on Oct. 15, 2014, the content of which is hereby incorporated by reference in its entirety.

FIELD

This disclosure relates generally to a system for visually displaying the status of use of aircraft overhead luggage storage bins.

BACKGROUND

Airplane turn time—the time required to unload an airplane after its arrival at the gate and to prepare it for departure again—has increased since the mid-1970s. This contributes to both flight delays and increased passenger frustration. One of the key elements of turn time in a single-aisle aircraft is passenger boarding and deplaning. One factor that contributes to an increase in passenger boarding time is an increase in the amount of passenger carry-on luggage. Passengers have increased their carry-on baggage for a number of reasons, including the implementation of checked baggage fees by the airlines. During the boarding process, finding available overhead luggage storage bin space for carry-on baggage becomes increasingly time consuming and frustrating for passengers and flight attendants, and can cause delayed departure. In particular, most passengers merely hope that the overhead luggage storage bin nearest to the passenger's assigned seat is open and has available space when boarding. If such bins are closed when the passenger arrives at his or her assigned seating row, such passenger has to open nearby bins, sometimes repeatedly, to locate space for storing his or her luggage. The need to open one or more bins before available storage space is located can cause delays and can affect on-time departure. When deplaning, a passenger may forget which overhead luggage storage bin contains his or her luggage, especially when the closest bins were full when the passenger originally boarded the plane. The difficulties in locating the particular overhead luggage bin holding a passenger's luggage can be even worse in twin aisle aircraft.

Airlines and aircraft manufacturers have attempted to address boarding delays in a number of ways. For example, airlines have modified the order of passenger boarding, but studies have shown that new boarding algorithms have proven largely ineffective in reducing boarding time. Airlines and manufacturers have also changed the size and shape of overhead bin storage space to make the space more usable, but because this option is limited by space constraints in the aircraft this has also been found ineffective in reducing boarding time.

Accordingly, there is a need for an improved system which assists in speeding the aircraft boarding and deplaning process.

SUMMARY

In a first aspect, a system for displaying the storage status of overhead luggage storage bins in an aircraft is disclosed.

The system includes a plurality of cameras, one for each of a plurality of groups of the overhead luggage storage bins. Each of the cameras is mounted adjacent to an associated one of the groups of the overhead luggage storage bins such that a field of view of the camera is directed at inner portions of the associated group of overhead luggage storage bins when at least one of the overhead luggage storage bins in the group is in an open position. The system also includes a plurality of projectors, one for each of the plurality of groups of overhead luggage storage bins. Each of the plurality of projectors is associated with a particular one of the plurality of cameras. Each of the projectors is mounted adjacent to an associated group of the overhead luggage storage bins such that an image projected by the projector is directed at outer surfaces of each of the overhead luggage storage bins in the associated group when at least one of the overhead luggage storage bins in the associated group is in a closed position. Each projector is configured to selectively project image onto the outer surfaces of each of the overhead luggage storage bins in the associated group. Finally, the system includes a controller communicatively coupled to the plurality of cameras and to the plurality of projectors. The controller is configured to receive images from each of the plurality of cameras and to selectively provide such images to the projector associated with each camera.

In one further embodiment, each of the cameras may operate continuously only during a portion of flight. Further, the portion of flight may be boarding. Still further, each group of the overhead luggage storage bins may include only a single overhead luggage storage bin. In this latter case, the controller may process images from each camera to determine when the associated overhead luggage storage bin becomes closed to identify an image of the associated overhead luggage storage bin from the camera at a point in time just before that overhead luggage storage bin becomes closed.

In another further embodiment, a plurality of sensors may be provided. Each of the plurality of sensors may be associated with a particular one of the plurality of overhead luggage storage bins. Each sensor may be mounted adjacent to the associated overhead luggage storage bin and may be configured to provide an output signal indicating when the associated overhead luggage storage bin becomes closed. The controller may identify an image of the associated overhead luggage storage bin from each camera at a point in time just before that overhead luggage storage bin becomes closed based on receipt of a signal from the sensor associated with that overhead luggage storage bin.

In one still further embodiment, each of the projectors may operate only when the associated overhead luggage storage bin is closed and only during portions of flight. The portions of flight may be boarding and deplaning. In another still further embodiment, each of the projectors may operate only when the associated overhead luggage storage bin is closed and when the controller detects motion adjacent to a latch on an outer surface of that overhead luggage storage bin.

In a second aspect, a method for displaying the storage status of an overhead luggage storage bin in an aircraft is disclosed. Images are captured of an inner portion of an overhead luggage storage bin when such overhead luggage storage bin is in an open position. The captured images are received and stored in a controller. Finally, at least one of the captured images are selectively projected onto an outer surface of the associated overhead luggage storage bin when such overhead luggage storage bin is in a closed position.

In a third aspect, a system for displaying the storage status of overhead luggage storage bins in an aircraft is disclosed. The system includes a plurality of cameras, one for each of the overhead luggage storage bins. Each of the cameras is mounted adjacent to an associated one of the overhead luggage storage bins such that a field of view of the camera is directed at an inner portion of the associated overhead luggage storage bin when such overhead luggage storage bin is in an open position. Each camera is configured to output images of the inner portion of the associated overhead luggage storage bin. The system also includes a controller communicatively coupled to the plurality of cameras. The controller is configured to receive images from each of the plurality of cameras and to store the received images in a memory.

In one further embodiment, the system may include a video display communicatively coupled to the controller and configured to selectively display images received from the controller. In this further embodiment, the video display may be one of a ceiling video display, a seat back video display, a portable video display system and a smart device running an application.

In another further embodiment, the system may include a means for displaying a utilization figure for each of the overhead luggage storage bins. In this further embodiment, the controller may be configured to calculate the utilization figure for each of the overhead luggage storage bins based on each received image and to output the calculated utilization figure to the associated means for displaying the utilization figure.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Overhead luggage storage bins in aircraft are used to store a passenger's carry-on luggage. During boarding, the storage bins are open and become filled as passengers board the aircraft. The storage bins must be moved to a closed position prior to takeoff. Often, a luggage bin may be prematurely closed by a passenger when not completely filled. The system disclosed herein reduces boarding delays by using a camera to record the latest status of an associated storage bin just prior to closing such bin, and then providing an image, e.g., an image projected by a projector onto the outer surface of the storage bin, that shows the latest storage status of such bin. In an aircraft embodying the system of the present disclosure, a passenger searching for available storage space when some or all of the overhead luggage storage bins are closed can quickly identify those overhead luggage storage bins which have space available for additional storage by reviewing the image associated with each overhead luggage storage bin (e.g., an image projected on the outer surface of the overhead luggage storage bin). In addition, a passenger forced to use a storage bin not adjacent to that passenger's seat can quickly locate that storage bin holding the passenger's luggage during flight or at deplaning by reviewing the projected image associated with each storage bin without the need to open any of the storage bins, reducing deplaning time by eliminating the need to open multiple bins to identify where a passenger's luggage is located.

Figure 1A:
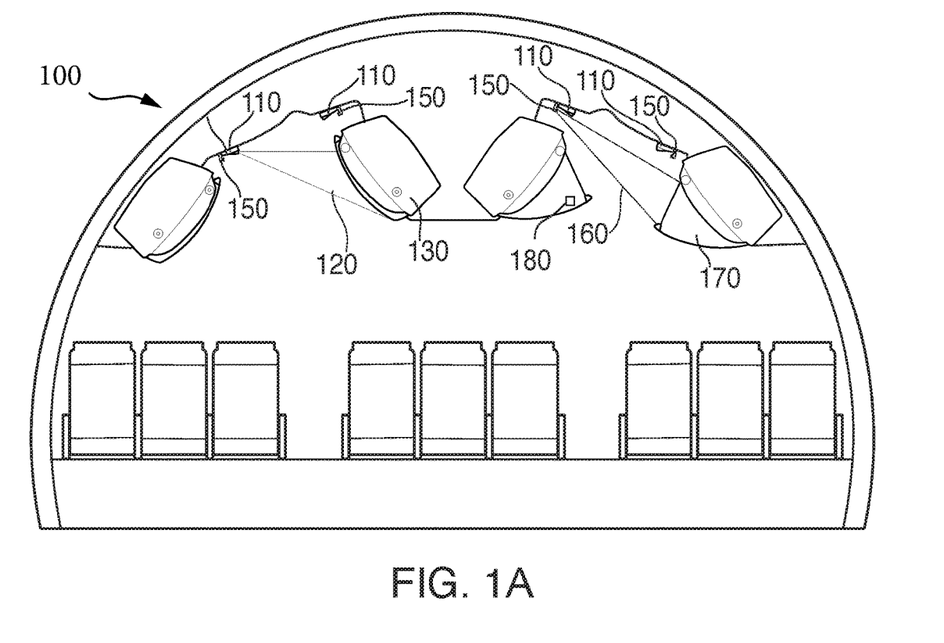
FIG. 1A and FIG. 1B are a diagrams showing a cross-sectional view of an aircraft cabin incorporating a first and second embodiments, respectively, of a system for visually displaying the status of use of aircraft overhead luggage storage luggage bins in accordance with advantageous embodiments.
Figure 3:
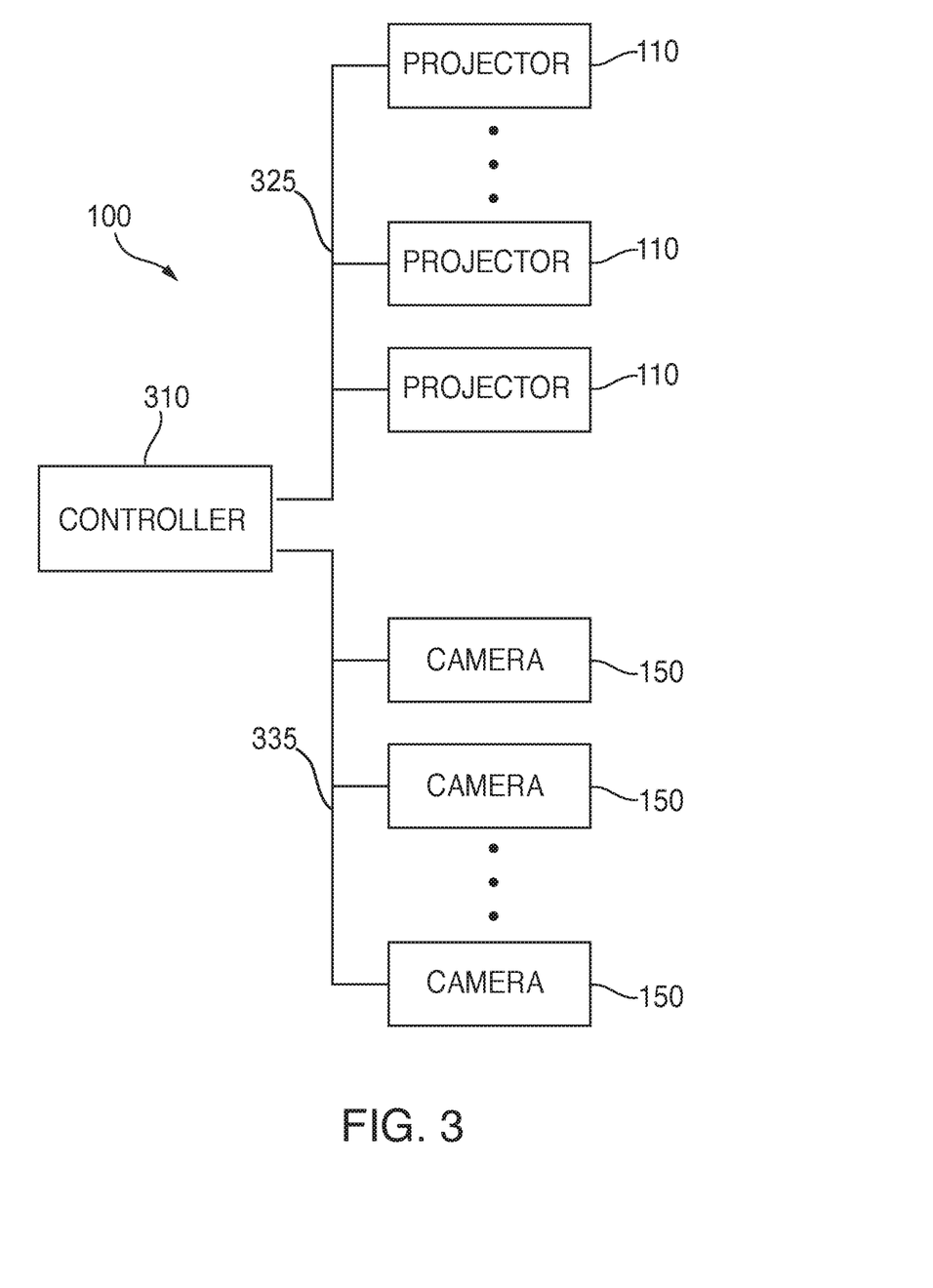
FIG. 3 is a block diagram of a system for visually displaying the status of use of aircraft overhead luggage storage luggage bins in accordance with an advantageous embodiment.

Referring now to FIG. 1A, a system 100 is shown for displaying the last known state of the overhead luggage storage bins in an aircraft. In one presently preferred embodiment, system 100 includes a plurality of projectors 110 and a plurality of cameras 150, one projector 110 and one camera 150 for each associated overhead luggage storage bin in the aircraft. In an alternative embodiment, each pair of projectors 110 and cameras 150 may be assigned to groups of more than one adjacent associated overhead luggage storage bins. As shown in FIG. 3, each of the projectors 110 and cameras 150 are coupled to a common controller 310 via respective associated communications links 325, 335. Each communication link 325, 335 may be wired or wireless and preferably provides for digital communication between the projectors 110 and cameras 150 and controller 310. In a presently preferred embodiment, each communication link 325, 335 is a local area network link. Further, the projectors 110 and cameras 150 may be connected in a daisy-chain configuration to minimize the amount of cabling required to couple all of the projectors 110 and cameras 150 to the controller 310.

Each camera 150 is positioned with a field of view 160 that covers the interior space of the associated overhead luggage storage bin (e.g., bin 170 in FIG. 1A) (or bins) and is configured to capture one or more images of the interior space of the associated overhead luggage storage bin (or bins) and provide such images to the controller for storage in a memory therein. Camera 150 may be configured to operate continuously during flight (or during portions of flight, e.g., during boarding and deplaning), capturing and transmitting a series of images to the controller, or may be configured to capture one or more images upon receipt of commands from the controller (e.g., camera 150 may operate only during boarding after receiving a continuous capture command from the controller). Camera 150 may be a pinhole-type network camera, for example, such as Titathink's Model No. TT520PW Hidden Wireless Security IP Camera, or equivalent. The controller may be configured to process the images (when camera 150 is operating in continuous mode) to identify an image of the interior space of the associated overhead luggage storage bin (or bins) at a point in time immediately prior to when the bin (or one of the group of bins) becomes closed (e.g., by determining when the associated bin starts to close). Alternatively, each overhead luggage storage bin may have a sensor 180 that provides a signal to the controller indicating when the bin (or one of the group of bins) transitions between the open and closed states. The sensor may be a switch coupled to the latching mechanism 220 of the storage bin, an accelerometer coupled to the bin that detects movement of the bin (i.e., during opening and closing) or an infrared proximity sensor mounted adjacent to the storage bin that also detects movement of the bin. In this case, the controller may be configured to identify an image of the interior space of the associated overhead luggage storage bin immediately prior to when the bin (or one of the group of bins) is closed based on receipt of such signal from the sensor.

Figure 1B:
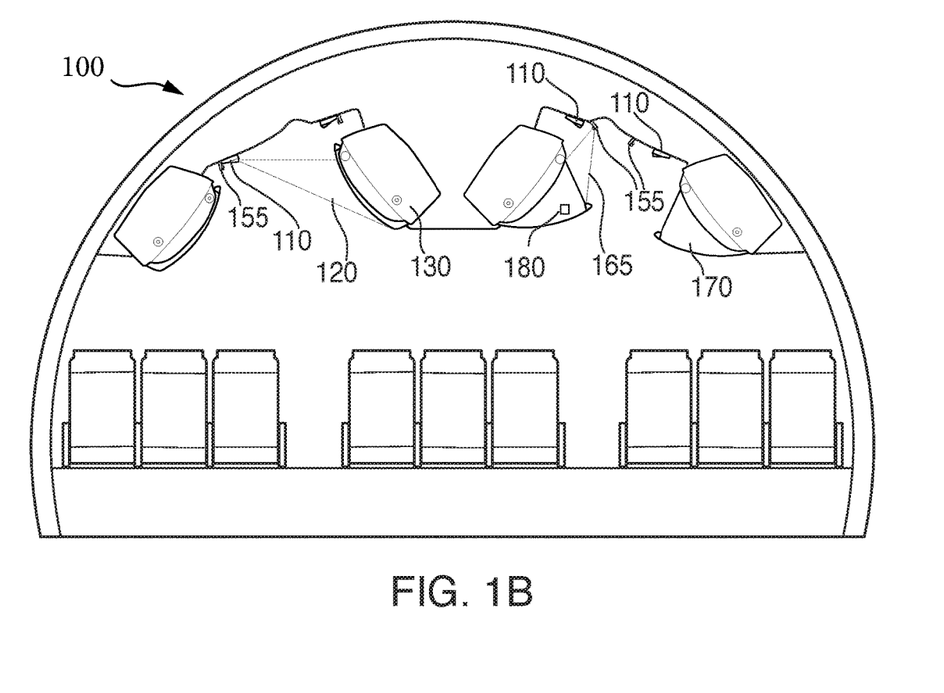

Referring now to FIG. 1B, an alternative embodiment is shown where each of the projectors 155 are mounted such the field of view 165 is directed at the interior of the adjacent overhead luggage storage bin, instead of at the opposing overhead luggage storage bin as in the FIG. 1A embodiment.

Figure 2A:
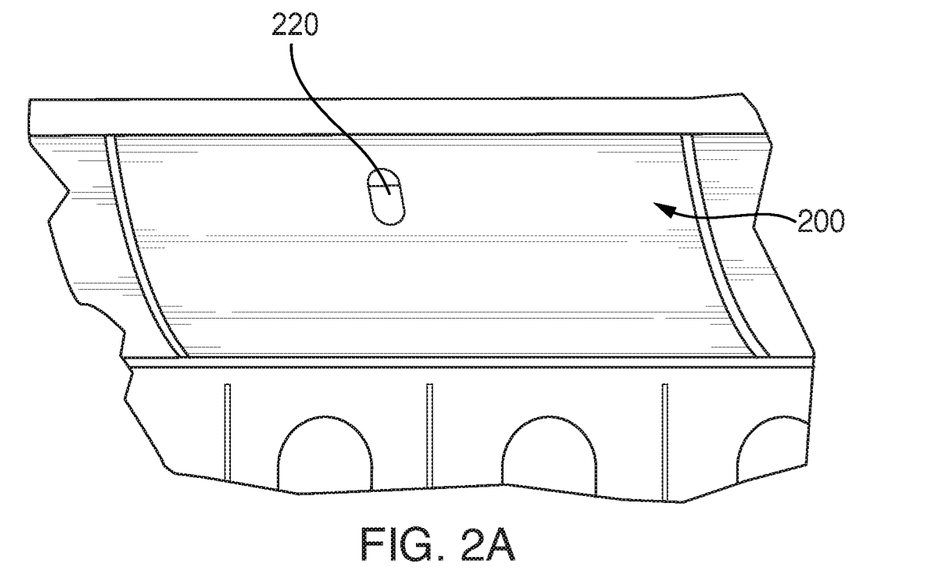
FIG. 2A is a diagram of an outer surface of aircraft overhead luggage storage luggage bin and FIG. 2B is a diagram of the outer surface of an aircraft overhead luggage storage luggage bin with an image projected thereon in accordance with an advantageous embodiment.
Figure 2B:
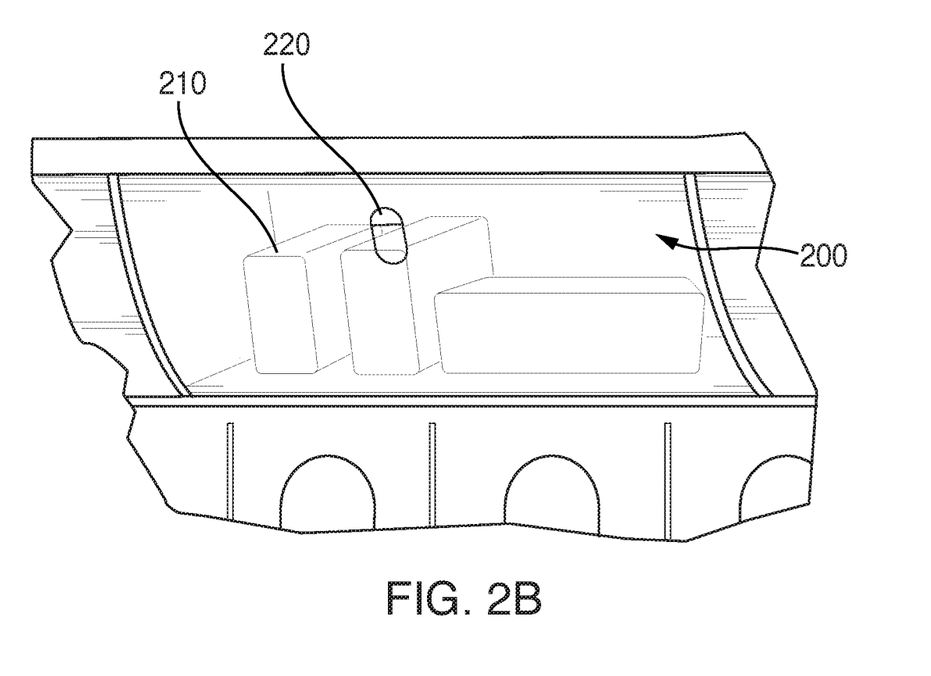

Referring now to FIG. 2, each projector 110 (as shown, for example, in FIG. 1A) is preferably a pico projector that is preferably mounted and configured so that an image 210 (as shown by light waves 120 in FIG. 1A) showing the status of the interior space is projected onto an outer surface 200 of the associated overhead luggage storage bin (e.g., bin 130 in FIG. 1A) or group of bins when each pair of projectors 110 and cameras 150 are assigned to groups of more than one adjacent associated overhead luggage storage bins. Projector 110 is preferably configured to operate only during certain portions of the flight when the associated overhead luggage storage bin (or group of bins) is closed, e.g., only during boarding and deplaning. In addition, in one further embodiment, when camera 150 operates in continuous mode, the controller may be configured to process the images received from camera 150 to determine when a passenger reaches to open a latch 220 (FIG. 2) for the overhead luggage storage bin (e.g., when motion is detected adjacent to the latch on an outer surface of that overhead luggage storage bin) and to activate the associated projector to provide the passenger with a visual cue of the storage status of such bin by projecting the storage status image on the outer surface of the bin. In this way, the passenger is provided with a visual cue of the storage status of such bin without having to open that bin.

In another further embodiment, the controller 310 can be coupled to (or be part of) a server that is used to distribute images of the storage status of selected overhead luggage storage bins via a ceiling video display (e.g., a ceiling projection system or a ceiling OLED display) at certain portions of the flight (e.g., during boarding, deplaning and whenever the particular bin is open). Still further, the server may also selectively distribute (e.g., based on a menu system) bin storage status images to a seat back video display (e.g., the display used for the in-flight entertainment system), a portable video display system, and/or an application running on a smart device such as a smart phone. The smart device application may be available only for use by the aircraft crew or may also be made available to passengers.

In a still further embodiment, controller 310 may be configured to analyze each image of the stored status of each overhead luggage storage bin to calculate a utilization figure for each bin. Controller 310 may be coupled to a graphical placard, a text based display, or indicator light associated with each overhead luggage storage bin, and can be configured to activate such graphical placard, a text based display, or an indicator light (or lights) based on the calculated utilization figure. For example, the graphical placard or text based display may be mounted on the external surface of the associated overhead luggage storage bin and can output a percentage of use figure based on the calculated utilization figure (e.g., indicate that the bin is fifty percent filled). Similarly, the indicator light may be lit when the calculated utilization figure exceeds ninety percent. Alternatively, a series of indicator lights may be provided for different capacities (e.g., twenty-five percent, fifty percent, seventy-five percent), with the particular light being lit when the calculated utilization figure exceeds that associated figure.

Figure 4:
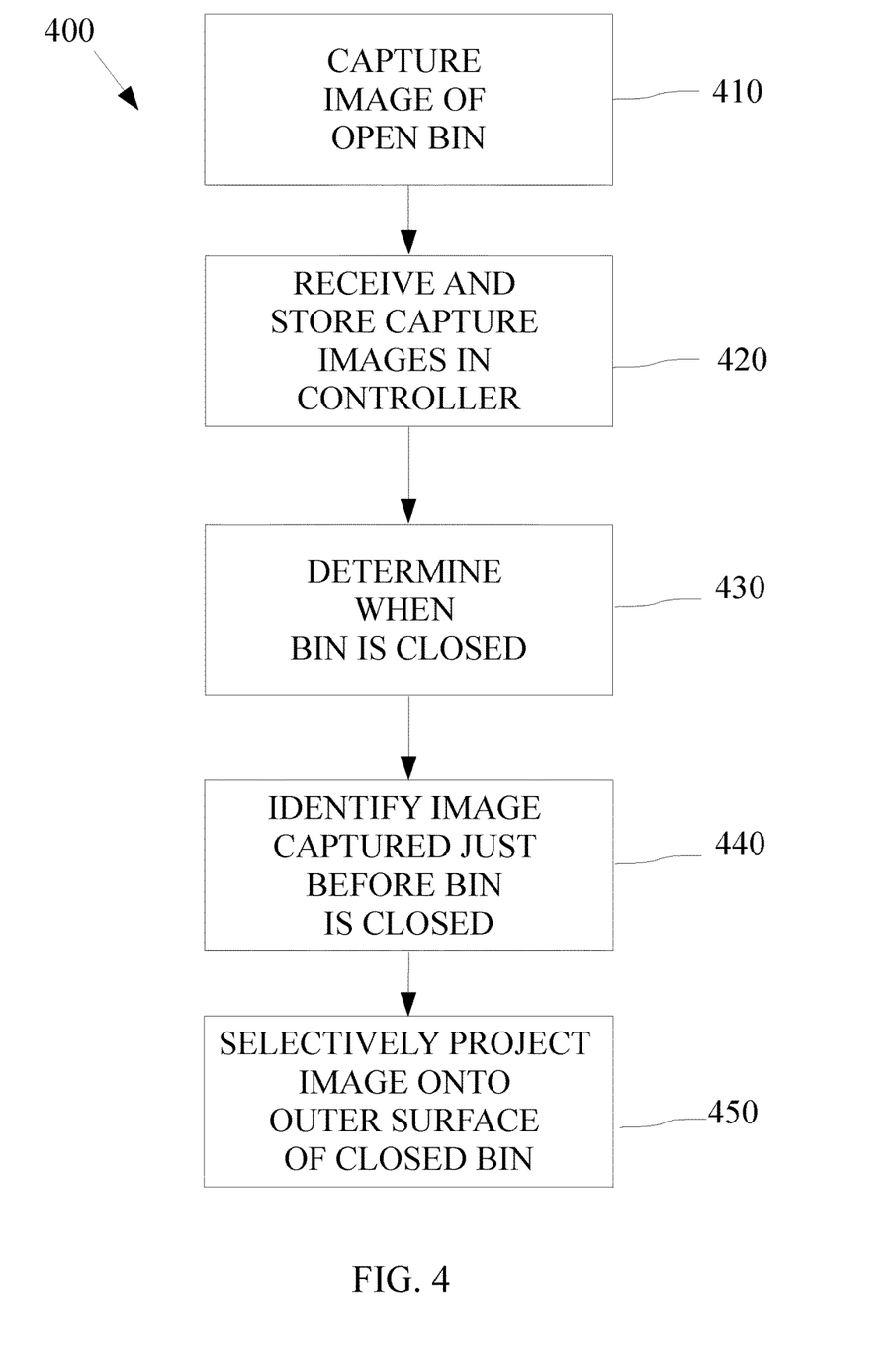
FIG. 4 is a flow diagram illustrating a method for displaying the storage status of an overhead luggage storage bin in an aircraft in accordance with an advantageous embodiment.

In addition to the above-disclosed operations, the flowchart 400 in FIG. 4 illustrates a method for displaying the storage status of an overhead luggage storage bin in an aircraft. First, at step 410, images of an inner portion of an overhead luggage storage bin are captured when the overhead luggage storage bin is in an open position. Next, at step 420, the captured images are received and stored in a controller (e.g., controller 310 in FIG. 3). Then, at step 430, a determination is made as to when the overhead luggage storage bin becomes closed. This determination may be made by processing the images from the camera, e.g., in controller 310 or based on the receipt of a signal from a sensor mounted adjacent to the overhead luggage storage bin, for example. Next, at step 440, an image of the overhead luggage storage bin from the camera at a point in time just before that overhead luggage storage bin becomes closed is identified. This identification may be made based on the processing of the captured images or on the sensor signal, for example. Finally, at step 450, the captured images are selectively projected onto an outer surface of the associated overhead luggage storage bin when the overhead luggage storage bin is in a closed position. In the method shown in flowchart 400, the images may be captured continuously only during a portion of flight, e.g., during boarding and/or deplaning. Further, the captured images may be selectively projected only when the associated overhead luggage storage bin is closed. Still further, the selective projection of the captured images may occur only when the associated overhead luggage storage bin is closed and when motion is detected adjacent to a latch on an outer portion of that overhead luggage storage bin. Alternatively, the selective projection of the captured images may be selectively initiated by a passenger and/or a flight crew member.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A system for displaying storage status of overhead luggage storage bins in an aircraft, the system comprising:
 a plurality of cameras, one for each of a plurality of groups of the overhead luggage storage bins, each camera of the plurality of cameras mounted adjacent to an associated group of the overhead luggage storage bins of the groups of the overhead luggage storage bins such that a field of view of the camera is directed at inner portions of the associated group of overhead luggage storage bins when at least one of the overhead luggage storage bins in the group is in an open position;

a plurality of projectors, one for each of the plurality of groups of the overhead luggage storage bins, each projector of the plurality of projectors associated with a particular camera of the plurality of cameras, each of the projectors mounted adjacent to an associated group of the overhead luggage storage bins such that an image projected by the projector is directed at outer surfaces of each of the overhead luggage storage bins in the associated group when at least one of the overhead luggage storage bins in the associated group is in a closed position, each projector configured to selectively project an image onto the outer surfaces of each of the overhead luggage storage bins in the associated group; and a controller communicatively coupled to the plurality of cameras and to the plurality of projectors, the controller configured to receive images from each of the plurality of cameras and to selectively provide such images to the projector associated with each camera.

2. The system of claim 1, wherein each of the cameras operate continuously only during a portion of flight.

3. The system of claim 2, wherein the portion of flight is boarding.

4. The system of claim 1, wherein each group of the overhead luggage storage bins includes only a single overhead luggage storage bin.

5. The system of claim 4, wherein the controller processes images from each camera to determine when the single overhead luggage storage bin becomes closed to identify an image of the single overhead luggage storage bin from the camera at a point in time just before that overhead luggage storage bin becomes closed.

6. The system of claim 1, further comprising a plurality of sensors, each of the plurality of sensors associated with a particular overhead luggage storage bin, each sensor mounted adjacent to a corresponding overhead luggage storage bin and configured to provide an output signal indicating when the corresponding overhead luggage storage bin becomes closed; and wherein the controller identifies an image of the corresponding overhead luggage storage bin from each camera at a point in time just before that overhead luggage storage bin becomes closed based on receipt of a signal from the sensor associated with that overhead luggage storage bin.

7. The system of claim 1, wherein each of the projectors operates only when a corresponding overhead luggage storage bin is closed and only during portions of flight.

8. The system of claim 7, wherein the portions of flight are boarding and deplaning.

9. The system of claim 1, wherein each of the projectors operates only when a corresponding overhead luggage storage bin is closed and when the controller detects motion adjacent to a latch on an outer surface of that overhead luggage storage bin.

10. A method for displaying storage status of an overhead luggage storage bin in an aircraft, comprising the steps of:

capturing images of an inner portion of an overhead luggage storage bin when such overhead luggage storage bin is in an open position;

receiving and storing the captured images in a controller; and selectively projecting such at least one of the captured images onto an outer surface of the overhead luggage storage bin when such overhead luggage storage bin is in a closed position.

11. The method of claim 10, wherein images are captured continuously only during a portion of flight.

12. The method of claim 11, wherein the portion of flight is boarding.

13. The method of claim 10, further comprising the steps of;

processing images to determine when the overhead luggage storage bin becomes closed; and identifying an image of the overhead luggage storage bin at a point in time just before that overhead luggage storage bin becomes closed.

14. The method of claim 10, further comprising the steps of:

receiving a signal from a sensor mounted adjacent to the overhead luggage storage bin indicating when the overhead luggage storage bin becomes closed; and identifying an image of the overhead luggage storage bin at a point in time just before that overhead luggage storage bin becomes closed.

15. The method of claim 10, wherein the at least one of the captured images is selectively projected only when the overhead luggage storage bin is closed and only during portions of flight.

16. The method of claim 15, wherein the portions of flight are boarding and deplaning and wherein the at least one of the captured images is selectively projected responsive to selectively initiation by a passenger or a flight crew member.

17. The method of claim 10, wherein the at least one of the captured images is selectively projected only when the overhead luggage storage bin is closed and when motion is detected adjacent to a latch on an outer surface of that overhead luggage storage bin.

18. A system for displaying storage status of an overhead luggage storage bin in an aircraft, comprising:

camera mounted adjacent to an associated overhead luggage storage bin such that a field of view of the camera is directed at an inner portion of the associated overhead luggage storage bin when such overhead luggage storage bin is in an open position, the camera configured to output images of the inner portion of the associated overhead luggage storage bin;

a controller communicatively coupled to the camera, the controller configured to receive images from the camera and to store the images in a memory; and a means for displaying a utilization figure for the overhead luggage storage bin, wherein the controller is configured to calculate the utilization figure for the overhead luggage storage bin based on the imaged and to output the utilization figure to the means for displaying the utilization figure.

19. The system of claim 18, further comprising a video display having a communications interface and configured to selectively display images received from the controller; and wherein the video display is one of a ceiling video display, a seat back video display, a portable video display system and a smart device running an application.

20. The system of claim 18, further comprising a projector configured to selectively project at least one of the images onto an outer surface of the associated overhead luggage storage bin when such overhead luggage storage bin is in a closed portion.

* * * * *

UNITED STATES PATENT AND TRADEMARK OFFICE
CERTIFICATE OF CORRECTION

| | | |
|---|---|---|
| PATENT NO. | : 10,936,879 B2 | Page 1 of 1 |
| APPLICATION NO. | : 15/383851 | |
| DATED | : March 2, 2021 | |
| INVENTOR(S) | : Yakentim M. Ibrahim, Kevin S. Callahan and James P. Schalla | |

It is certified that error appears in the above-identified patent and that said Letters Patent is hereby corrected as shown below:

In the Claims

Claim 18, Column 8, Line 50, change:
"imaged"

To read:
--images--

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*